United States Patent Office 3,117,944
Patented Jan. 14, 1964

3,117,944
COAGULA OF COLLOIDAL FIBROUS BOEHMITE AND ACRYLAMIDE POLYMERS AND PROCESSES FOR MAKING SAME
Robert W. Harrell, Mill Creek Hundred, Del., assignor to E. I. du Pont de Nemours and Company, Wilmington, Del., a corporation of Delaware
No Drawing. Filed July 28, 1960, Ser. No. 46,027
9 Claims. (Cl. 260—41)

This invention relates to novel compositions which are insoluble and do not spontaneously disperse in water, the compositions comprising (1) colloidal fibrous alumina monohydrate having the boehmite crystal lattice and (2) water-soluble acrylamide polymer having high molecular weight, and further relates to processes for making the compositions, the processes comprising mixing dilute aqueous dispersions of the alumina monohydrate and acrylamide polymer and recovering the insoluble product so formed.

More particularly, the invention is directed to coagula in which the alumina monohydrate fibers are bonded by the acrylamide into structures in which the fibers are substantially oriented with respect to each other—that is, their longest axes are substantially parallel—and is further particularly directed to processes in which the oriented coagula are formed by mixing the aqueous acrylamide polymer solution and the aqueous alumina monohydrate fiber dispersion with agitation of sufficient intensity to commingle the components without causing complete turbulence and are thereafter separated from the aqueous menstruum.

It is relatively easy to find flocculants for hydrated aluminas, including the colloidal fibrous alumina monohydrate materials with which this invention is concerned. The ordinary flocculants, however, do not form workable coagula of oriented fibers. Rather, the products are either firm, stiff jels which, once formed, cannot be reshaped, or they are thin, watery jellies which are completely lacking in strength and cannot be molded or drawn to useful shapes.

The soluble polyacrylamides are known as flocculants and have been used to some extent as flocculants for certain types of soils. It has not hitherto been known that these polyacrylamides could be used effectively for flocculating fibrous alumina monohydrate and especially has it not been known that if such use were attempted, the results would be any different from those obtained with other flocculants as above mentioned.

Now according to the present invention it has been found that when soluble polyacrylamides in the form of dilute solutions are mixed with dilute aqueous dispersions of colloidal fibrous alumina monohydrate having the boehmite crystal lattice there are formed in the aqueous menstruum coagula which have properties which are entirely unique and have outstanding utility in that they have relatively high wet strength and are workable or moldable to desired shapes without loss of strength. By effecting the mixing with a degree of agitation which is sufficient to commingle the components without causing complete turbulence, orientation of the alumina monohydrate fibers with respect to each other is achieved.

For convenience in the description which follows the colloidal fibrous alumina monohydrate having the boehmite crystal lattice will be referred to as fibrous boehmite and the water-soluble acrylamide polymer having high molecular weight will be referred to as polyacrylamide. Compositions which do not spontaneously disperse in water will be referred to as non-dispersible although it will be understood that any substance can be dispersed in water by suitable application of well-known suspension techniques. Compositions which do not dissolve in water to an extent more than 5% by weight at 25° C. will be referred to as water insoluble.

The term "coagulum" is used in its conventional sense to designate a coagulated mass or substances. The coagula of the present invention more particularly are such coagulated masses which maintain their shape in the presence of a liquid phase rather than adjusting their volumes continuously to incorporate such liquid phase indefinitely as is the case with a viscous solution or dispersion. The coagula can, of course, swell to some extent, but do not do so indefinitely and therefore retain their physical form with some increase in size in the presence of a liquid phase.

The term "oriented" as applied to the compositions of the invention means that the compositions exhibit a directionality with respect to the crystallographic axes of the ultimate boehmite crystallite fibrils contained therein. This orientation exists both on a microscopic and a macroscopic scale. On a microscopic scale, the ultimate fibrils tend to align themselves in the coagula in such a manner that the long axis of the fibrils coincides with the long axis of the coagulum particles; that is, the fibrils of the boehmite crystallite tend to aggregate primarily in an end-to-end manner as opposed to a random, or brush-pile type of structure.

In describing the fibrous boehmite used, the specific surface area will be expressed in square meters per gram, abbreviated $m.^2/g$. The axial ratio will be the ratio of the average length of fibril to the average breadth.

*The Fibrous Boehmite*

Often the particles of the fibrous boehmite used in making a composition of this invention are well formed and sharply defined little fibers or fibrils. These fibrils have at least one dimension in the colloidal range, and the fibril diameters in any particular product are usually quite uniform.

Fibrous boehmite can be prepared as a colloidal sol by heating an aqueous dispersion of certain aluminas under carefully controlled conditions in the presence of critical amounts of strong monobasic acids. Processes for its preparation are described in detail, for example, in U.S. Patent 2,915,475 issued to John Bugosh. Sols can be dried to redispersible powders.

Preferably, the boehmite fibrils have an axial ratio of at least about 20:1. It is more specifically preferred that the axial ratio be above about 50:1. The axial ratio can be as high as 300:1 or even higher, but ordinarily the ratio will be between about 60:1 and 200:1.

Usually the width and thickness of the boehmite fibrils are of the same order of magnitude and are less than about 15 millimicrons but not much less than about 3 millimicrons. More particularly, it is preferred that the diameter of the boehmite fibrils be in the range from about 3 to 10 millimicrons, fibrils having average particle diameters in the range from about 4 to 7 millimicrons being especially preferred.

The length of the boehmite fibrils is indicated by the foregoing ratios. More specifically, the fibrils preferably have lengths of about from 100 to 1500 millimicrons as shown by electron micrograph measurements. Still more preferred are lengths averaging about from 100 to 1000 millimicrons. In speaking of particle size and shape, it will be understood that reference is made to the average of fibril particles; that is, the average width or length of all such particles in a given sample or quantity of the boehmite.

The fibrous boehmite used in the invention is further defined by its specific surface area. Measurement of the specific surface area of the dried, fibrous boehmite products provides an accurate and precise method for ascertaining the smaller two dimensions of the particles. The specific surface area can be determined by nitrogen adsorption according to methods with which the art is familiar. In general, the boehmite fibrils can have specific surface areas in the range from about 100 to 400 m.²/g. Preferred are fibers having specific surface areas from about 200 to 400 m.²/g. and more preferred are those in the range from about 250 to 350 m.²/g.

While the fibrous boehmite used in making the compositions of this invention can be in a dry state initially, or in various forms or states of aggregation, it is preferable to use the fibrous boehmite in the form of an aqueous dispersion in which the individual fibrils are agglomerated as little as possible.

In making the compositions of the invention it is also preferred in many instances to use fibrous boehmite sols which have a very low ion content. The fibrous boehmite sols prepared according to the above-mentioned Bugosh Patent 2,915,475 often will contain an aluminum ion or basic aluminum iron in small proportion, as well as very substantial proportions of monovalent acid radicals. Such acid radicals can be removed by deionization with ion-exchange resins, resulting in replacing it with hydroxyl ions. Alternatively, the acid radical can be removed as the free acid, for example, as hydrochloric acid or acetic acid. Strong acid radicals can be removed, for example, by ion exchange according to the teachings of U.S. Patent 2,733,205, issued January 31, 1956, to Dalton et al.

Strong acid radicals can also be removed in the form of salts by gelling the fibrous boehmite sol with a base and then filtering and washing until the salt of the strong acid radical is practically entirely removed. Preferably, the sol is gelled with concentrated ammonium hydroxide at pH 10 at about 70 to 90° C., filtered hot, and then washed with water having pH 10 until anion free, followed by washing with distilled water. This deionized cake, which generally contains from 5 to 15% $Al_2O_3$ can be reconstituted to an aqueous dispersion by vigorous agitation, and if further dispersion is desired, a weak or strong monobasic acid can be added to lower the pH, for example, to about 3 to 7.

Use of the deionized fibrous boehmite sols prepared as above described is particularly desirable in making coagula for use in the electrical industry because the salt-free character of the coagula results in minimum electrical conductivity.

The proportion of fibrous boehmite used in compositions of the invention can vary within relatively wide limits. When formed bodies of pure alumina such as papers, fibers, or molded objects are to be prepared, the fibrous boehmite may be employed in relatively large proportions and can constitute as much as 90% by weight of the total composition. Moreover, when fibrous boehmite is the only water-insoluble solid component of the composition (the polyacrylamide being originally water soluble), it will usually be desirable to employ at least 20% of fibrous boehmite having an average fiber length in exces of 500 millimicrons.

When fibrous boehmite-polyacrylamide coagula are used as binding agents with other refractory inorganic fibers or plate-like materials, the most useful of the compositions will contain between 2 and 75% by weight of fibrous boehmite. In other applications, wherein fibrous boehmite is employed as a cobinding agent along with another binding material, as in the bonding of papers with a dispersion of such a water-insoluble resin as phenol formaldehyde resin, the fibrous boehmite-polyacrylamide bodies of the composition can exert extremely useful scavenging, mordanting, and flocculating activity at remarkably low levels. In these uses even as little as 1% and sometimes even .5% of fibrous boehmite can greatly improve the water resistance, resin retention, pigment retention, and green strength of both inorganic and organic papers and can improve the white-water clarity, total solids recovery, and drain time involved in making such papers. Ordinarily, however, even in such uses fibrous boehmite in amounts of from 3 to 5% give improved results as compared to lesser proportions.

*The Polyacrylamide*

The polyacrylamides used in the compositions and processes of this invention are water-soluble acrylamide polymers having high molecular weight. It will be understood that this generic terminology also includes copolymers of acrylamide with other materials copolymerizable therewith, such as methyl vinyl ether, glycidyl ether, and vinyl acetate. Such products are generally prepared by polymerizing acrylamide with another vinyl monomer such as those just mentioned, until high molecular weight material is obtained.

The acrylamide polymer can be partially hydrolyzed to increase its water solubility. This is accomplished by suitable hydrolysis of the acrylamide functional group in the polymer, the hydrolysis being carried out in water, preferably at elevated temperatures. The resulting partially hydrolyzed polyacrylamide polymer or copolymer then comprises a backbone of carbon-to-carbon linkages of high molecular weight, and extending from this backbone carboxylic acid and amide functional groups. In those cases where comonomers rather than pure acrylamide was used in preparing the polymer, the carboxylic acid and amide groups extending from the backbone will be interspersed with the groups of the comonomers, such as ether groups.

The molecular weight of the polyacrylamide should be high—that is, in excess of 20,000. Preferably it will be in excess of 50,000 and still more preferably in excess of 100,000. With sufficient care polymers having molecular weights as high as two million can be prepared and the products are useful constituents of the compositions of the invention. Molecular weights substantially higher than two million usually result in a lowered water solubility or in very long-delayed solution times, and so are not generally preferred.

The molecular weight or degree of polymerization of the polyacrylamides can be determined in any of several ways well known to the art. It can, for example, be determined by the techniques of light-scattering, osmotic pressure determinations, a comparison of the variation of viscosity with concentration, by measured streaming birefringence, and by various other methods with which the art is familiar.

It is preferred that the high molecular weight polyacrylamides be primarily straight chain, although a substantial amount of chain branching is not harmful. It is, however, essential that the amount of three-dimensional cross linking of the polymer be limited to relatively low values. For this reason it is not desirable to introduce substantial quantities of polyfunctional vinyl co-monomers such as divinylbenzene.

If the polyacrylamide is partially hydrolyzed the extent of hydrolysis can vary between broad limits. In general products in which between 5 and 95% of the hydrolyzable groups have been hydrolyzed can be used. The less highly hydrolyzed products are somewhat less water soluble and are not quite as efficient flocculating agents on a weight-by-weight basis as those with hydrolysis percentages of about 50%. It is definitely not preferred that the hydrolysis proceed completely to the stage of polyacrylic acid.

The degree of hydrolysis can be somewhat higher than 50% in those products containing appreciable amounts of a non-hydrolyzable monomer such as methyl vinyl ether. The polyacrylic acid portion of such copolymers can be hydrolyzed to 90% hydrolysis. Pure polyacrylamide polymers should not be hydrolyzed beyond about 70 to 80%, however. While the exact mechanism of the functioning of these polyacrylamides with boehmite is not known precisely, it has been found that functional groups other than carboxylic acids must be present in the polymer to obtain the unusual combination of properties peculiar to the compositions of this invention.

The extent of hydrolysis can be determined also by techniques well developed in the art. The carboxylic acid functional groups which are furnished by the hydrolysis reaction can be determined by titration with a suitable base. This can be done in aqueous solution if precautions are observed to do the titrations rapidly, at a low temperature, and in the presence of a considerable excess of a neutral salt such as sodium chloride. The first two precautions are necessary to prevent excessive additional hydrolysis during the titration reaction, and the neutral salt is useful for minimizing the change of the acid dissociation constant of the polymeric acid as a function of its degree of neutralization.

A more highly preferred procedure for determining degree of hydrolysis is to dissolve the polyacrylamide in a suitable, non-aqueous solvent, or a mixed solvent comprising water and a water-miscible organic liquid such as acetone or methanol, followed by titrating with a strong organic base such as tetranormal butyl ammonium hydroxide. The degree of hydrolysis can also be determined by forming a water-insoluble salt of the polyacrylamide, washing to remove the excess salt, and analyzing for the salt cation retained with the polymer.

A number of commercially available polyacrylamide, high molecular weight, water-insoluble polymers are listed in the following table, together with elemental chemical analysis and the ratio of intensity of carbonyl absorption band to the ether absorption band as determined from their infrared spectra measured by dispersing these materials in potassium bromide and pressing to form an optically clear wafer of the potassium bromide containing the partially hydrolyzed polyacrylamide Also included in the table are the elemental chemical analyses for acarylamide and ammonium acrylate It will be noted that, in general, the chemical analyses of the tabulated commercially available polyacrylamides are intermediate between those of acrylamide and ammonium acrylate with the modifications to be expected as a result of the inclusion of other materials such as methyl vinyl ether From the data given in this table it can be calculated that "Separan" NP-10 is approximately 40 to 45% hydrolyzed, "Separan" NP-20 is about 50% hydrolyzed, and "Aerofloc" 3171 is quite extensively hydrolyzed and in fact is near the upper limit of hydrolysis permissible. These commercial products are in the required molecular weight range of greater than 20,000 as shown by the very high viscosity of their relatively dilute solutions.

*Polyacrylamides*

| Material | Percent C | Percent N | Percent O | Percent H | Ratio of Carbonyl Absorption to Ether Absorption [3] |
|---|---|---|---|---|---|
| Acrylamide | 50.8 | 19.75 | 22.5 | 7.05 | |
| Amonium acrylate | 40.5 | 15.72 | 36.0 | 7.86 | |
| Methyl vinyl ether | 60.0 | | 26.7 | 13.30 | |
| "Separan" NP-10 [1] | 47.3 | 16.80 | 28.5 | 7.15 | 9.8 |
| "Separan" NP-20 [1] | 46.2 | 17.12 | 30.0 | 7.24 | 7.4 |
| "Aerofloc" 3171 [2] | 39.9 | 15.43 | 30.1 | 6.61 | 2.1 |
| "Superfloc" 16 [2] | 47.22 | 17.78 | 27.6 | 7.57 | 9.9 |

[1] A product of the Dow Chemical Company.
[2] A product of American Cyanamide.
[3] Infrared absorption.

The materials illustrated in the table are selected merely as commercial representatives of water-soluble polyacrylamide polymers and copolymers. It will be understood that minor modifications or departures of the polyacrylamides from the characteristics described, such as the inclusion of other monomer species, the formation of sodium or potassium salts, or other such modifications, which would be readily apparent to those skilled in the art but which do not represent a substantial change in the properties of polyacrylamides, are not regarded as departing from the spirit of the invention.

The proportion of polyacrylamide used in compositions of this invention can be varied widely but is always less than the proportion of the fibrous boehmite. Put another way, the boehmite constituent is at least larger than 50% by weight of the sum of the weights of boehmite and polyacrylamide solids. The more highly preferred compositions have a ratio of about 3 parts of fibrous boehmite to 1 of polyacrylamide and ratios as high as 95 parts of fibrous boehmite to 5 of polyacrylamide are often effective.

The proportion of polyacrylamide required can, of course, be affected by other, optional constituents of the compositions. Thus, when positively charged additives or adjuvants of a relatively high surface area are present in substantial quantities, as more fully discussed hereinafter, they absorb appreciable quantities of the polyacrylamide and thus compete with the fibrous boehmite surface for interaction with the polyacrylamide. In these instances additional polyacrylamide should be supplied to compensate for that adsorbed on the additive surface. The boehmite surface has a peculiar affinity for polyacrylamides, however, and only very highly positively charged and high surface area additives can compete sufficiently for the polyacrylamide to make it necessary to increase the proportion of polyacrylamide solids over the maximum above specified.

The approximately correct proportions of polyacrylamide and boehmite to be employed in any given composition of the invention can be determined relatively easily by direct observation. The fibrous boehmite confers a noticeable turbidity and Tyndall effect to a solution as long as it has not been flocculated or coagulated. In making the coagula of the invention additions of the polyacrylamide are continued until a clear supernatant liquid is obtained in the reaction menstruum, after settling the coagulum. Additions of polyacrylamide substantially in excess of the amount necessary to achieve clarification of the supernatant liquid generally have little effect since they are water soluble and are not incorporated into the coagula. There is little advantage in adding a large excess of the polyacrylamide constituent, once clarification of the supernatant liquid has been achieved.

*Optional Components*

It is frequently desirable to include in the boehmite-polyacrylamide compositions various additives and adjuvants to achieve specific desired properties or effects. The adjuvants can broadly be classified as fibrous materials, fillers, and miscellaneous adjuvants.

The fibrous materials which can be incorporated into the compositions of this invention can be synthetic or naturally occurring and can be either organic or inorganic. Suitable organic fibers, for instance, include wood pulp, cotton and other cellulosic fibers, silk, ramie, hemp, alpaca, camel hair, fur, goat hair, horse hair, wool, and animal bristles generally. Synthetic organic fibers which can be used include nylon (polyamide fibers), acrylic fibers, polyester fibers, cellulose acetate, regenerated cellulose acetate (rayon), polyvinylchloride, polyethylene, polypropylene, polyurethane, polytetrafluoroethylene, and like fibers.

Included among the supplemental inorganic fibers are fibers of asbestos, talc, wollastonite, hectorite clay, and other aluminosilicates, glass, amorphous silica, potassium titanate, mineral fibers made from molten rock such as the fibers commonly called rockwool, carbon, metals such as stainless steel or aluminum, corundum, titanium dioxide, mullite, titanium carbide, and titanium nitride.

The proportion of such supplemental fibers which can be included in compositions of the present invention can vary widely because very minor proportions serve to modify the properties of the fibrous boehmite-polyacrylamide coagula, and conversely, very minor proportions of the coagula can produce substantial changes in the properties of major proportions of the supplemental fibers. Thus, the amount of supplemental fiber can range from about 1% to as much as 9% by weight of the total compositions. Amounts of supplemental fiber ranging from 1 to 10% impart additional flexibility and strength to the aluminiferous formed bodies, papers, and fibers prepared from the fibrous boehmite-polyacrylamide materials. Conversely, the boehmite-polyacrylamide constituents can be used in amounts ranging from 1 to 40% of the fibers to give film-forming or paper-like matts bonded with the coagula. Even smaller percentages of the coagula can be used in such operations as clarification of white water in paper-making operations or the mordanting of dyes or pigments or negatively charged binders to supplemental fiber surfaces.

Non-fibrous fillers can also be incorporated into the boehmite-polyacrylamide compositions to achieve special effects such as pigmentation, or to provide materials for subsequent high-temperature reaction as explained in more detail hereinafter. While these fillers will usually be inorganic oxides of double oxides (considering calcium silicate as a mixed oxide of calcium oxide and silica) in a finely divided state wherein the particles range in size from a few hundred microns down to colloidal size and as low as 10 millimicrons, other fillers such as carbon, both in the form of graphite and carbon black, can also be used. Thus, the fillers can include various types of silicates such as naturally occurring clay minerals including kaolin, vermiculite, mica, bentonite, attapulgite and other similar materials. Various types of pigents such as titania, zirconia, zinc oxide, calcium silicate and ferric oxide can also serve as fillers.

Colloidal and finely divided oxides which chemically react with alumina upon heating to high temperatures are a particularly useful group of fillers. These materials include silica, $P_2O_5$, $Cr_2O_3$, and nickel oxide and other spinel-forming oxides of the bivalent metals. Compositions comprising fibrous boehmite, polyacrylamide, and a filler of the above class can be formed into objects such as fibers, papers, sheets or rods, dried, and subsequently heated to a high temperature to effect a chemical reaction between the filler and the fibrous boehmite. In this way it is possible to form objects and convert them by heating into such forms as chromia-alumina refractories, aluminosilicate glass, mullite, and a wide range of spinel structures having interesting electronic and magnetic characteristics. Catalyst compositions can be formed in a similar manner. Thus, chromium-alumina catalysts, platinum-alumina catalysts, aluminosilicate catalysts, and in general any type of catalyst composition containing at least 50% $Al_2O_3$ can be obtained in various physical forms. Compositions including even lower percentages of alumina can be prepared if there is present a supplemental fibrous material as well as the reactive filler. Moreover, at temperatures above about 1000° C. it is possible to effect chemical reaction between the fibrous boehmite constituent and various of the inorganic supplemental fibers or fiber-forming materials of the type previously discussed.

Colloidal silica sols in which the silica is present as discrete particles having an average ultimate size in the range of about 5 to 150 millimicrons are especially valuable as optional additives.

Miscellaneous adjuvants can also be included in compositions of the invention to serve specific purposes. These include, for instance, a wide variety of organic and inorganic binders such as phenolformaldehyde resins, aluminum phosphate and sodium silicate. Surface-active agents can also be included. A particularly useful class of such miscellaneous adjuvants include polar, hydrogen-bonding, high-boiling liquids and solids which are useful as plasticizing agents for maintaining a high degree of flexibility in the compositions of the invention even after they have been dried. Among such materials are ethylene glycol, glycerol, polyvinyl alcohol, polyethylene oxide-modified alcohols and polyalcohols, sugars, and starches. The miscellaneous adjuvants will usually comprise from about .1% to as high as about 30% by weight of the total composition and even higher quantities can be used for special purposes.

Processes of the Invention

Broadly speaking, the novel products as above described are made by mixing dilute aqueous dispersions of the alumina monohydrate and acrylamide polymer and recovering the insoluble product so formed. The acrylamide, being soluble, is of course in a state of molecular dispersion in the aqueous medium. The manner of mixing is not critical if orientation of the boehmite fibers in the product is not required. If supplemental fibers, fillers, or other adjuvants are desired in the final product, they can be included in one or the other of the aqueous dispersions which are to be mixed or they can be added separately but simultaneously.

The extent of dilution of the reactants is an important factor in obtaining products of the desired type. The concentration of the polyacrylamide component in its solution should be less than about 1% by weight. Above this concentration, the high molecular weight of the polyacrylamide causes the viscosity to be quite high, and this in turn makes it very difficult to achieve satisfactory mixing. This is particularly true when the mixing must be such as to give oriented products. Furthermore, there is a danger of getting a non-uniform distribution of the polyacrylamide and boehmite constituents with respect to each other, and if the concentration of polyacrylamide is too high, it may lead to coagula containing localized areas having high concentrations of boehmite and other localized areas comprising almost pure polyacrylamide with no fibrous boehmite. When the polyacrylamide has a molecular weight near the upper range above mentioned it is particularly preferred that its concentration in the solution added be only a few tenths of a percent or even only a few hundredths of a percent by weight.

Somewhat similar limitations apply to the dilution of the fibrous boehmite dispersion. Since the boehmite constituent is an extremely effective thickening agent, its concentration in the dispersion added should be maintained below about 30% and preferably below 10%. For products of greatest uniformity and highest orientation it is preferred that the concentration be below about 5% by weight. Concentrations even as low as 1% are quite satisfactory and even lower concentrations can be used down to about a thousandth of 1%. If the dispersion is substantially more dilute than this, the boehmite may fail to flocculate completely.

The concentrations of additives and adjuvants in the dispersions added to the mixture can vary over a considerable range but will usually be in the range of from .1 to about 30% by weight.

To make the preferred coagula in which the boehmite fibers are bonded by the acrylamide into structures in which the fibers are oriented with respect to each other the manner of mixing the boehmite and acrylamide dispersions is controlled so as to give an orienting hydrodynamic gradient—that is, the dispersions are mixed with agitation of sufficient intensity to commingle the components without causing complete turbulence—and the coagula are thereafter separated from the aqueous menstruum. In a particularly preferred aspect of the invention the orienting hydrodynamic gradient is sufficiently strong that there is microscopic orientation with respect to the crystallographic axes of the individual fibrils of boehmite and also a macroscopic orientation of manyfold aggregates of oriented fibrils.

To achieve the desired hydrodynamic gradient the boehmite and acrylamide dispersions are mixed under conditions of streamline flow—that is, flow of a character which does not produce turbulence. Thus, for example, the separate solutions can be contacted with stirring with a paddle or turbine-type stirrer or can be mixed in a small orifice and ejected under high pressure, as for example in a jet mixer. Alternatively, the two quiescent dispersions can be contacted and the coagulum formed at the interface can be withdrawn, the speed of the withdrawal from the interfacial area being slow enough that the coagulum is not ruptured, but fast enough that an orienting gradient is effectuated by the flow of the fluid material (in excess of that which can be held within the structure of the coagulum) back into the interfacial area under the influence of gravity.

Because the coagula have a peculiar property of healing themselves after being ruptured, and of bonding together spontaneously upon contacting similarly constituted coagula, orientation can be effected by forming the coagula under highly turbulent mixing conditions which give only poor orientation, and subsequently impressing orientation upon the coagula by further mechanical operations such as pressing, as in a Carver press, under high compaction pressures, extrusion through a small orifice such as a die, or other procedures wherein the individual particles of the coagula are contacted in the presence of a strong orienting gradient.

The extent to which orientation of the boehmite has been effected on a microscopic scale in a coagulum can be easily determined by adaptation of methods already well known in the art. The oriented coagula have the ability to rotate the plane of polarized light and by measuring the amount of such rotation the extent of orientation can be judged semiquantitatively by examining the coagula with a polarizing microscope. A quantitative determination can be made in a polarimeter of the type commonly used for determination of rotation in sugar solutions. The degree of orientation can also be determined by an examination of the X-ray diffraction patterns of the dried coagula by adaptation of procedures used for determining the extent of orientation of organic polymeric fibers such as nylon.

The nature and extent of orientation of the boehmite fibers in the coagula can also be directly observed by examination with the electron microscope. The presence of many-fibril boehmite units can be observed in optical micrographs and the extent of macroscopic orientation thereby determined.

In the preferred coagula at least the majority of the ultimate boehmite fibrils have their long axes within at least a 45° angle of correspondence with respect to the average direction of the long axes of the other particles; that is, in the oriented coagula, the majority of the ultimate fibrils have their axes within 45 degrees of the axes of the others. It will be understood, of course, that this type of orientation is desirable within a particular coagulum particle and it need not necessarily be true in regard to the average axes of orientation of other separate and distinct coagulum particles in a massive structure of such coagula. Such massive structures can comprise those in which individual coagulum particles overlap at somewhat smaller angles to form long, continuous threads or monofilaments.

In a particularly preferred oriented coagulum the ultimate fibrils are not only oriented in the individual coagulum particles but bundles of ultimate oriented fibrils form macroscopic multifibrillar units which extend in space for a distance of the order of 100 to several thousand times that of the length of an individual fibril. The degree of orientation of these larger units with respect to one another can be widely varied, however.

Although orientation is usually achieved by selecting the proper type of agitation to be employed in mixing the boehmite and acrylamide dispersions, it will be understood that hydrodynamic gradients imposed by other procedures can also be used as long as they lead to appreciable orientation as judged by the techniques above described. Thus, preferred compositions can be made by alternately dipping a plate first in one of the dispersions and then in the other. When the plate is allowed to drain, orienting gradients are set up by the force of gravitational flow.

Orientation can also be achieved by the operation of surface tension forces. Thus, a coagulum in which the boehmite is randomly disposed can be deposited upon a surface and dried. The operation of the forces of surface tension together with the orienting forces resulting from the peculiar interaction of the polyacrylamide with the fibrous boehmite impose a substantial and useful degree of orientation as a result of forces of surface tension exerted during the drying of the coagulum mass by the liquid interface as it passes through the structure.

If supplemental fibers, fillers, or adjuvants are to be included in the coagula, their manner of incorporation should not, of course, be permitted to alter the mixing conditions as already described above. This sometimes requires that certain initial precautions be observed, as for instance in those cases where the additive or adjuvant either has a relatively high surface area or is ionically or molecularly dissolved in the liquid. In such cases it is important that the additive or adjuvant be mixed only with that essential constituetnt with which it is compatible, so that premature flocculation or gelation prior to mixing the essential ingredients is avoided. For example, a negatively charged colloidal silica sol should not be mixed with the fibrous boehmite dispersion lest flocculation or gelation thereof occur. By adjusting the pH of the silica sol to about 4, however, the negative charge on the silica particles is substantially dissipated and the relatively dilute sols at this pH can be mixed with the boehmite without flocculation. Alternatively, the silica sol can be mixed with the polyacrylamide dispersion at a pH of about 9, since these two materials are compatible, and the mixture can then be mixed with the boehmite dispersion.

Thus, as a general rule, it is desirable to mix together with the boehmite dispersion or polyacrylamide dispersion only such constituents as have similar charges on the heaviest portion of the molecule or colloidal particle. Negatively charged colloids and negatively charged ions having valences in excess of 1, as well as negatively charged wetting agents (for instance, those in which the long-chain hydrocarbon portion of the molecule bears a negative charge) should not be mixed with the boehmite dispersion. Ordinarily, positively charged colloids and high positively charged ions, particularly from wetting agents, should not be mixed with the polyacrylamide dispersion.

Since hydroxyl ions can flocculate fibrous boehmite in aqueous dispersion, it is also desired that the pH of the fibrous boehmite dispersion should not be allowed to exceed about 5 and preferably should not be more than 4, prior to contacting it with the polyacrylamide dispersion.

Adjuvants and additives which are substantially neutral, such as glycerol, polyvinyl alcohol, etc., can be mixed with either dispersion as is convenient.

The novel fibrous boehmite-polyacrylamide compositions of this invention, which are insoluble and do not spontaneously disperse in water, are formed by mixing the dilute aqueous boehmite and polyacrylamide dispersions as above described. Recovery of these compositions from the aqueous menstruum in which they are formed has already been described for certain mixing processes as an integral part of the mixing step. With other modes of mixing the recovery can constitute a separate step. The method of recovery selected will depend in some instances upon the ultimate use to which the coagula are to be put.

Even in the presence of the aqueous menstruum in which they were formed, the coagula can be worked in any desired manner to obtain macroscopic formed bodies of almost any required size, shape, configuration, degree of porosity, or permeability. Thus, they may be pressed, extruded, molded by hand, spun, drawn, cast, or filtered to achieve the desired shape, form or physical dimension. Since the coagula posses appreciable strength even when immersed in the liquid in which they are prepared and in addition possess a high bonding affinity for such other surfaces as metals, ceramics, papers, textiles and the like, and also have self-healing characteristics exemplified by their ability to bond to one another, there is practically no limitation on the possible forms into which the coagula can be shaped.

Either before or after shaping the coagula, the liquid menstruum in which they were formed can be removed in any convenient manner, such as by evaporation, filtration, decantation, and the like. The coagula are usually in a highly swollen condition when formed from dilute dispersions, and contain within their structures a considerable quantity of the liquid menstruum in which they were prepared. This can be eliminated by pressing the materials, or by drying them. Drying temperatures up to about 250° C. in air can be employed without substantial degradation of the properties of the compositions.

Higher temperatures than about 300° C. cause decomposition of the polyacrylamide constituent of the coagula and hence are to be avoided if only drying of the coagula is desired. Thus, products which have been heated above 300° C. differ from the products obtained at lower temperatures in that no longer do they possess latent bonding characteristics or latent flexibility—that is, they no longer have the property of regaining almost completely the flexibility and adhesive characteristics of the coagulum when they are again contacted with a polar hydrogen bonding solvent such as water, glycerol, or ethylene glycol. These properties of adhesiveness and flexibility can be preserved even after drying, if a high-boiling liquid such as glycerol or ethylene glycol is present in the coagula as they are initially formed.

The products obtained by heating the coagula above about 300° C. are not without utility. In these products the polyacrylamide constituent is decomposed and the structure sets irreversibly into a strong, rigid, ceramic body having whatever configuration it had as of the moment of decomposition of the polyacrylamide.

The Coagula

The boehmite-polyacrylamide coagula do not have to be dried to achieve a high degree of both mechanical strength and water insolubility. The bond formed within the coagulum is flexible, tough, and elastic even while the coagulum is still in the reaction menstruum, and it retains these properties as long as the coagulum contains appreciable amounts of polar hydrogen bonding liquid such as water, ethylene glycol, or glycerol. Upon elimination of the liquid a strong but rigid bond is formed. If the material is rewet with the liquid, it again becomes flexible and plastic and still retains much of its strength.

The coagula possess "self-healing" characteristics. If they are ruptured while the material is still immersed in a liquid, they can be re-formed simply by reestablishing contact between the ruptured areas. New bonds between several coagulum particles are established in the same fashion.

The coagula have high residual binding affinity—that is, large amounts of liquids and particulate solids can be retained within their structures. A high binding affinity between exterior solid surfaces and the coagula is also demonstrated by their striking adhesive properties when in contact with such surfaces as metals, ceramics or paper. The coagula can form highly oriented structures. They can spontaneously form macroscopic stable fibers quite similar in appearance and properties to cotton linters, kraft pulp, or asbestos fibers of a paper-making grade. They can also be spun into monofilament fibers by drawing, interfacial spinning, or extrusion through an orifice.

In summary, the coagula have a unique degree of formability for a material which is primarily inorganic and refractory. The coagula can be molded, extruded, spun, cast, pressed, or filtered into almost any desired shape or dimension. They can also be prepared with a wide and controllable range of density, porosity, and permeability. Thus, films, sheets, rods, papers, fibers, matts, insulation batts, bricks and foamed structures are easily formed by conventional techniques from the coagula.

More particularly, extremely strong, inorganic papers containing only relatively small amounts of organic material (polyacrylamide) can be formed from the compositions of the invention which contain fibrous boehmite, polyacrylamide and a plasticizer, or these constituents and additional fibrous or plate-like materials such as asbestos, fiber glass, fibrous quartz, or clay minerals such as mica. Such papers are strong and flexible, do not decompose up to temperatures up to 250° C. even in air, have excellent water resistance and wet strength, and can be converted to low or zero porosity materials by impregnating agents such as polymeric silicones, phenol formaldehyde resins, sodium silicate, high dielectric oils, waxes, and the like.

Such inorganic papers are highly useful for most of the purposes for which asbestos papers have previously been used, they are rot-resistant, insect-proof, strong, flexible, and fire-resistant.

A further utility of the coagula is that after being formed in any desired shape they can be heated above 300° C. to decompose the polyacrylamide and permanently set the composition, converting it to a ceramic-like, rigid body. By the inclusion of reactive additives such as colloidal silica, alumina-base ceramic compositions of a wide variety and diversity of chemical types can be prepared.

In particular embodiments of the compositions just mentioned, spinel structures such as magnesium aluminate, nickel aluminate, and the like may be prepared by incorporating as reactive additives either nickel salts or water-insoluble, finely divided nickel oxide. Aluminosilicate glasses, and aluminosilicate ceramics such as mullite, can be prepared by incorporation of the correct proportions of colloidal silica in conjunction with the fibrous boehmite. High-alumina porcelain can be prepared by incorporation of 3 to 4% by weight of silica along with similar amounts of materials such as magnesium oxide, manganous oxide, titania, vanadium pentoxide, and similar materials which function as grain growth restricting agents for alumina. As previously noted, various types of catalysts and catalyst bases may also be prepared in a wide variety of physical forms in this fashion.

A particularly useful application of the compositions of the invention lies in the fabrication of pure alumina and high-alumina, porcelain-type bodies having extremely thin dimensions, in complex shapes. Since alumina matts and papers can be readily prepared from the coagula by standard paper-making techniques and with the addition of plasticizing agents such as glycerol can be maintained in a completely flexible condition indefinitely, it is possible to make long sheets or rolls of highly aluminiferous paper. Such compositions can also be cut, molded or shaped into any desired form such as tube envelopes, dielectric spacers, insulating bases, and even complete modules for complex electronic components. After forming the complex shapes they can be fired at high temperatures. The foregoing procedures can, for example, be applied to the manufacture of alumina nose cones such as missile nose cones or for the preparation of radomes or other very large bodies of alumina which are almost impossible to form in any other manner. To prepare these bodies it is only necessary to wind the thin, sheet-like compositions on a mandrel having the desired shape, impregnate them, if desired, with additional solutions of fibrous boehmite or aluminum salts, or both, or optionally with aluminum phosphate solutions to give a higher density to the finished alumina body, and fire the resulting compositions to temperatures in the range of 1500 to 1800° C. Similar operations can, of course, be performed with monofilament compositions when the forming operation is done by winding the monofilament around the desired mandrel or form.

The invention will be better understood by reference to the following illustrative examples.

Example 1

A fibrous boehmite sol, hereinafter sometimes referred to as a "short-fibered" sol, was prepared by stirring 2% by weight of a redispersible fibrous boehmite powder into distilled water. The boehmite powder was made by drum-drying a boehmite sol obtained by autoclaving a 4.5 weight percent dispersion of basic aluminum diacetate in water at 160° C. for one hour under autogenous pressure, in the presence of 1.25 mole percent ammonium sulfate, based on the number of moles of $Al_2O_3$ present. After autoclaving, the resulting product was then drum-dried to give a dispersible boehmite powder analyzing about 69 to 70% $Al_2O_3$, 10% acetate radical expressed as acetic acid, and an amount of sulfate proportional to that which was introduced during the autoclaving operation. This powder comprised ultimate fibrils of fibrous boehmite which were 80 to 100 millimicrons long, and 4 to 5 millimicrons in diameter. The powder had a specific surface area of 290 m.$^2$/g.

A second fibrous boehmite sol, hereinafter sometimes referred to as a "long-fibered" sol, was prepared by a procedure somewhat analogous to that described above. In this case, however, the ammonium sulfate was omitted. After heating for one hour at 160° C. under autogenous pressure, this sol was cooled and diluted to 2% without drying. This sol comprised ultimate fibrils of fibrous boehmite which were considerably longer than those prepared in the presence of the ammonium sulfate. Their average particle diameter was from 4 to 5 millimicrons, also, but their lengths were from 700 to 1000 millimicrons. The surface area and the chemical composition, aside from the presence of the sulfate, were substantially the same as those of the sol discussed above.

A dispersion containing 0.15% of a commercially available, partially hydrolyzed, high molecular weight, water-soluble polyacrylamide having the empirical composition 43% carbon, 6.84% hydrogen, 16.2% nitrogen, and 28.3% oxygen, corresponding to a carbon-to-nitrogen mole ratio of 3.2, and having an intensity of the principal carbonyl absorption band in the infrared spectrum, relative to that of the principal ether absorption band, of 7.4 was prepared by dissolving the polyacrylamide in water to make a 1% dispersion and then diluting to 0.15% with distilled water.

Three hundred and forty-two parts by weight of the 0.15% polyacrylamide solution was then subjected to agitation with a high-speed mechanical agitator of the high-shear type, and 150 parts by weight of a 2% fibrous boehmite sol, which was a mixture of 60% by weight of the long-fibered sol and 40% by weight of the short-fibered sol above mentioned, was added, this mixture was blended for three minutes, and the mixture was then poured into two liters of water. A second batch of material was made in an identical fashion and mixed with this first batch to give a total mixture comprising about 5 liters of water and containing approximately 6 grams of fibrous boehmite. This combined mixture was stirred for 30 seconds at moderate speed.

The mixture was then furnished to the head box of a Noble and Wood laboratory sheet papermaking machine, and the head box filled to the top with water. A paper was formed by the conventional procedure, using a 100-mesh Monel screen.

The resulting paper formed very rapidly with a total drain time of only 36 seconds. It was rolled between felts after stripping from the screen, and dried at 170° C. for 15 minutes. This paper had excellent "green" strength, which facilitated its removal from the screen. It also had excellent wet strength, in that it was not at all affected by re-immersion in water. It retained approximately 50% of its dry tensile strength even after soaking in water for a period of several hours. While wet, it could be molded into any desired shape, and upon drying retained the shape of the mold around which it was dried. Upon being wet with 10% of glycerol, based on the weight of alumina, the paper became permanently flexible. The thickness of this paper was about 8.1 mils and its strength was about 4.6 pounds per inch of width, as determined on a conventional paper tensile testing machine. This corresponds to an ultimate tensile strength of 570 pounds per square inch.

The paper was impregnated with a mixture of 10% short-fibered boehmite sol in water, in an amount sufficient to double the total $Al_2O_3$ content of the paper. The impregnating solution also contained sufficient glycerol to give a final concentration of 10% glycerol based on the weight of the paper. Upon redrying at 110° C. for one hour a very much stronger paper, having a tensile strength of about 1200 pounds per square inch, was obtained.

Samples of the paper as formed and of the impregnated paper were heated in an oven slowly through the temperature range of from room temperature to 1700° C. During this heating, all volatile constituents were driven off, and the fibrous boehmite was converted into alpha alumina, i.e., corundum. A thin sheet of crystalline corundum paper was obtained. The sheet formed from the impregnated paper was somewhat stronger than that formed from the original paper. Although both of these papers were somewhat brittle, as might be expected for a completely ceramic material, they showed good strength for their very thin dimensions.

Example 2

A procedure substantially identical to that described in Example 1 was employed, except that the fibrous boehmite used was the long-fibered sol rather than a mixture of long- and short-fibered material. An additional modification was that after forming the paper in the papermaking machine but prior to pressing it between felts, additional pressure was put upon the paper while it was still in the head box of the papermaking machine. This resulted in a very much stronger paper. The drain time in this case to form the paper was about 68 seconds, the thickness was 9.1 mils, and the strength in pounds per inch width was 13.2. The ultimate tensile strength was 1450 pounds.

Example 3

A procedure substantially identical to that followed in the first two examples was used to prepare two additional papers. The partially hydrolyzed, water-soluble polyacrylamide used, however, was a somewhat similar product, which had a lower degree of hydrolysis. This material had the following empirical analysis: 44% carbon, 15.9% nitrogen, 27.1% oxygen, and 6.76% hydrogen. The intensity of the carbonyl absorption band in the infrared relative to that of the ether absorption band was 9.8, and the carbon-to-nitrogen mole ratio was 3.3.

A 0.15% dispersion of this polyacrylamide was prepared as in Example 1. Two papers were prepared using this material as a flocculating material to form an oriented, water-insoluble coagulum.

The first paper, which contained equal weights of short- and long-fiber boehmite, had a total drain time of 90 seconds, a 7.5 mils thickness, a strength of 1.2 pounds per inch of width, and a tensile strength of 160 pounds per square inch. It showed the same characteristics of flexibility and water insensitivity as that prepared from the previous type of polyacrylamide, but was somewhat weaker.

A second paper was prepared using this flocculating agent, but in this preparation all of the fibrous boehmite was of the long-fiber variety. This paper was quite a bit stronger. It had a drain time of 210 seconds, a thickness of 8 mils, and a strength of 2.9 pounds per inch, corresponding to a tensile strength of 360 pounds per square inch.

*Example 4*

This example demonstrates the effect of adding a small amount of fiber glass to impart additional strength and flexibility to the type of compositions discussed in the previous examples.

A 1% aqueous suspension of a glass fiber of a borosilicate type suitable for making a glass paper was used. The glass fibers had a diameter between 0.5 and 0.75 micron. This 1% dispersion was mixed with the long-fibered boehmite dispersion in an amount sufficient to give 10% glass based on the weight of the alumina, and a paper was prepared in a manner otherwise identical to that described in Examples 1 and 2.

The drain time on this paper was only 33 seconds, and the paper after drying was substantially more flexible than papers of the previous examples. Its thickness was 10.5 mils. Its strength was greater than 10 pounds per inch of width, corresponding to a tensile strength in excess of 950 p.s.i. Upon firing to 1700° C., in the manner described in Example 1, this paper gave a very strong high alumina ceramic type sheet.

*Example 5*

In this example, a commercially available aqueous dispersion containing 30% by weight of colloidal amorphous silica particles having a particle diameter of about 15 to 20 millimicrons was diluted to 1% $SiO_2$ by weight with distilled water and acidified with dilute acetic acid to a pH of 3. It was then mixed with long-fibered boehmite sol to give a proportion of 50% by weight of $Al_2O_3$ to silica. This sol was used to prepare a paper in the manner described in Example 1.

Upon firing this paper to 1600° C., a smooth, glazed sheet of porcelain-like ceramic was obtained. This sheet was very strong and compared very favorably in strength with commercially available refractory ceramics.

*Example 6*

This example shows the preparation of microfibers of corundum and of an aluminosilicate glass composition from the compositions of this invention. A coagulum was first prepared of the long-fibered boehmite and the polyacrylamide as described in Example 1, except that very slow rates of agitation were used in mixing. This gave a substantially unoriented, gelatinous coagulum instead of the well-defined macroscopic fibers of Example 1.

Upon suspending this coagulum on the surface of a screen, and withdrawing the screen at a slow rate from the dispersion, continuous, very thin filaments were drawn under the influence of the gravitationally induced hydrodynamic flow. These fibers were allowed to dry in air and were fired in a gas Bunsen flame to a dense corundum fiber suitable for very high temperature insulation.

This procedure was repeated with the 50% alumina-50% silica composition of Example 5. These fibers had somewhat poorer initial green strength, but upon firing were converted to an amorphous refractory aluminosilicate glass fiber, which showed good strength and flexibility.

Fibers similar to those described above were also prepared by a technique known as interfacial spinning. In this procedure, a dispersion of the short-fibered boehmite was prepared in dimethylformamide using as a dispersing aid about 3% nitric acid based on the weight of the fibrous boehmite. A 1% sol of fibrous boehmite in dimethylformamide thus formed was poured gently over the surface of a 0.2% aqueous solution of the polyacrylamide used in Example 1, to form a quiescent layer. Oriented coagula formed at the interface. The coagulum was carefully withdrawn from this interfacial region and from it was spun extremely fine diameter fibrils. These could be converted, by heating, to corundum fibers similar to those formed by the previously noted spinning procedure.

*Example 7*

Two papers were formed in a procedure substantially identical with that of Example 1, except that two other commercially available, partially hydrolyzed, polyacrylamide flocculants were employed. The first of these was a material having an analysis of carbon 38.4%, nitrogen 15.2%, oxygen 28.6%, hydrogen 6.5%, and intensity ratio in the infrared of the principal carbonyl absorption band to the principal ether absorption band of 2.1, and a carbon-to-nitrogen mole ratio of 2.9. It was used in similar concentrations and dissolved in an identical fashion to the polyacrylamide material of Example 1. A paper formed as in Example 1 but using this polyacrylamide had a drain time of 80 seconds, a thickness of 10 mils, a strength of 6.7 pounds per inch of width, and a tensile strength of 670 p.s.i.

A second paper was prepared using another partially hydrolyzed polyacrylamide having 47.2% carbon, 17.8% nitrogen, 27.6% oxygen, and 7.6% hydrogen. The ratio of the carbonyl to the ether intensity bands of the infrared was 9.9 and the carbon-to-nitrogen mole ratio was 3.1. This material was used to prepare a paper in a fashion similar to that of Example 1. The paper had a formation time of 36 seconds, a thickness of 7.8 mils, a strength of 5.2 pounds per inch width, and a tensile strength of 670 p.s.i.

It is to be noted that the above partially hydrolyzed polyacrylamides differ substantially in their degree of hydrolysis and in their ratio of carbonyl to ether intensity infrared absorption bands from the previous products, but the strength of the papers obtained is substantially identical.

*Example 8*

This example shows the preparation of a flexible high-alumina porcelain paper which can be sintered at relatively low temperatures to give strong, dense ceramic objects of any desired shape.

A dispersion was first prepared containing long-fibered boehmite sol, and 5%, based on the weight of said boehmite sol, of a fibrous quartz having fiber diameters of less than one micron. To this was added 5%, based on the weight of the alumina, of acidified colloidal silica sol of the type used in Example 5, 10% of glycerol, based on the weight of alumina, and sufficient magnesium acetate to give 2% magnesium oxide based on the weight of the alumina. This mixture was then flocculated with a 0.2% polyacrylamide solution, of the type described in Example 1.

The flocculated mixture was pressed while still in the head box of the papermaking machine, removed from the screen, and dried. Following this, it was impregnated with a mixture of 5% aluminum nitrate and 5% fibrous boehmite until the pickup of this impregnating solution equalled the previous solids content. It was then dried for 15 minutes at 170° C. This gave an extremely strong, flexible, inorganic paper which upon firing at 1500° C. for 3 hours gave a strong porcelain ceramic. Prior to firing, this material could be cut or stamped or molded into any desired shape. It could also be wound around and laminated to itself, by rewetting it, to make large, complex alumina bodies, such as nose cones for rockets or extremely large diameter alumina tubes. These bodies could then be fired. They shrink uniformly in all dimensions, retaining their original size and shape except for the shrinkage associated with the elimination of the porosity.

Example 9

Dispersions of a larger particle size fibrous amorphous silica which had diameters in the particle size range of 5 microns, were prepared. The dispersions also contained 20% of short-fibered boehmite based on the weight of the fibrous silica. These were flocculated in the manner described in Example 1, with 5% of polyacrylamide, based on the total composition, the flocculation being effected with a 0.15% solution. The flocculated mixtures were made into papers and dried, and gave uniform papers with fairly good green strength and wet strength. Their dry strength, however, was considerably lower than that of the 100% alumina papers.

Example 10

A dispersion of an aluminosilicate glass refractory fiber, comprising approximately equal weights of alumina and silica, was prepared by dispersing the fibers in distilled water in a high-speed, high-shear mixer. A 1% fibrous boehmite dispersion was then mixed with this material in an amount sufficient to comprise 20% of the weight of the aluminosilicate solids. This was then flocculated with 5% of polyacrylamide, based on the combined weights of boehmite and aluminosilicate, the polyacrylamide being supplied as a 0.15% solution in the manner described in Example 1. The flocculated mixture was made into a paper as described in Example 1. The paper obtained was uniform but relatively weak. Both this paper and the fibrous quartz paper described in Example 9 were very much stronger than unbonded papers of fibrous quartz or of the aluminosilicate fiber.

Example 11

A 3% dispersion of fibrous potassium titanate was prepared in distilled water and to this was added sufficient 1% aqueous dispersion of short-fibered boehmite to comprise 40% on the total weight of the composition. This was then flocculated with a 0.20% solution of the polyacrylamide of Example 1 in an amount sufficient to comprise 6% of the total composition.

The flocculated product was dried to give a relatively weak paper having a tensile strength of about 100 p.s.i. This paper showed an unusual combination of insulating characteristics when it was used as an insulating paper and exposed to temperatures in the range of 1100° C. The high reflectivity to infrared radiation of the potassium titanate and the highly refractory characteristics of the dehydrated alumina originating from the fibrous boehmite, gave an insulating paper which in its over-all characteristics of resistance to deformation coupled with high insulating ability was superior to papers prepared either from fibrous boehmite alone or potassium titanate alone.

Example 12

A 5% dispersion of graphitic boron nitride having a particle size of approximately 5 microns was prepared in water and to this was added 50% by weight of long-fibered boehmite as a 1% solution. This was then flocculated with the polyacrylamide of Example 1, the amount of flocculant being 10% by weight of the total composition and being supplied as a 0.20% solution. The flocculation was done in the manner described in Example 1.

A paper was formed which comprised 50% alumina and 50% boron nitride. Whereas this paper was not quite as strong as the pure alumina papers described in some of the examples discussed above, it was considerably more flexible, possibly as the result of the flake-like character of the graphitic boron nitride.

Example 13

A dispersion of very finely divided synthetic fluorine-containing mica was prepared at a 3% concentration in water. To this was added 40%, based on the weight of the total composition, of fibrous boehmite as an aqueous 1% long-fiber boehmite dispersion. This was then flocculated with 10% polyacrylamide as a 0.20% solution as described in Example 1.

The flocculated material was made into paper as previously described. The paper showed a very high level of flexibility. This material could then be impregnated with high dielectric constant oils or resins such as epoxy resins, silicone resins, dielectric waxes, etc., to form materials for the preparation of condensers, etc.

Example 14

A dispersion of polytetrafluoroethylene resin was prepared by diluting with distilled water a commercially available, concentrated resin dispersion. The pH was lowered to 4 by addition of acetic acid. This dispersion was mixed with 40%, based on the weight of the total composition, of long-fibered fibrous boehmite supplied in the form of a 1% aqueous dispersion. The dispersion was flocculated with 10% of its weight of polyacrylamide in the form of a 0.20% solution, as described in Example 1.

The flocculated mixture was made into a paper. The paper so obtained could be fired at about 300° C. to fuse the polytetrafluoroethylene and form a chemically resistant, extremely high temperature paper.

Example 15

A dispersion of kraft paper pulp similar to that conventionally used in making ordinary papers was prepared and diluted to a concentration of 5%. Ten percent of colloidal kaolin, 20% of a finely divided pigment grade of titanium dioxide, and 20% of a "B" stage phenol formaldehyde resin supplied in the form of a 15% aqueous dispersion, all of the previous percentages being based on the weight of the kraft, were then added. Twenty percent fibrous boehmite, based on the weight of the kraft and supplied in the form of a 1% aqueous dispersion of long-fibered boehmite, was added after the pH of the kraft dispersion had been dropped to 4 by the addition of acetic acid. The whole dispersion was then flocculated by the addition of 10% of the polyacrylamide of Example 1, based on the weight of the kraft pulp and supplied in the form of a 0.20% solution.

The flocculated mixture was made into a paper which, after curing to complete the polymerization of the phenol formaldehyde resin binder, showed an exceptionally high wet strength and dry strength compared to a paper which did not contain the fibrous boehmite and polyacrylamide coagulum-forming constituents. An additional factor noted was that both the $TiO_2$ and the resin retention was very much more complete in this paper than in a control paper containing the same constituents but not containing the fibrous boehmite and the polyacrylamide. It was also found that the white water was much clearer than was the white water for the control paper.

Example 16

A dispersion of 20 grams of a 6D grade of short-fibered Canadian chrysotile asbestos in water was prepared by blending the asbestos in one liter of water in a high-speed, high-shear mixer for 3 minutes. Short-fibered boehmite, in the amount of 16.7% based on the weight of the total composition solids, was then added while the asbestos suspension was being stirred rapidly. Then, 4.2% of the polyacrylamide of Example 3, based on the weight of the total composition, was added in the form of a 0.15% solution, to bring about flocculation.

The flocculate product was made into a paper as previously described. The resulting paper had a drain time of a minute and 55 seconds, a thickness of 30.2 mils and a strength of 40 pounds per inch width. The tensile strength was 1230 pounds. Even after the polyacrylamide binder was completely burned out in an oven at 250° C. for two hours, the paper still showed a tensile strength of 490 pounds.

Example 17

A dispersion of chrysotile asbestos was prepared as described in Example 16. To this was added 8.4% of a short-fibered fibrous boehmite dispersion, based on the weight of the total composition, and 8.4% of a colloidal dispersion of asbestos which had been formed by dispersing the 6D Canadian chrysotile asbestos in a high-speed, high-shear agitator with 30% of its own weight of a basic aluminum acetate. Five percent of aluminum nitrate, based on the weight of the total composition, was then added as a 5% aqueous dispersion. This mixture was flocculated, while stirring, with 4.2% of the polyacrylamide of Example 3, based on the weight of the total composition and supplied as a 0.20% solution.

This mixture was formed into a paper which had a thickness of 34.3 mils, a strength of 22 pounds per inch of width, and a tensile strength of 641 pounds. After burning out the polyacrylamide at 250° C. for 2 hours in a muffle, this paper still had a strength of 12.8 pounds per inch of width, and a tensile strength of 420 pounds. It was noted that, as compared to the results described in the previous example, the colloidally dispersed asbestos and the aluminum nitrate apparently minimized the loss of strength resulting from burning out of the polyacrylamide.

Example 18

Twenty grams of Canadian chrysotile asbestos, 6D grade, were dispersed by agitating in water in a high-speed, high-shear mixer for 15 minutes, to give a more highly dispersed suspension of asbestos than that described in the previous examples. To this was added 16.7% short-fibered boehmite as a 1% dispersion and the resultant mixture was flocculated with 4.2% of the polyacrylamide of Example 1, based on the weight of the total composition and supplied as a 0.20% dispersion. This paper was pressed while in the head box and dried as previously described. It had a thickness of 26 mils, a strength of 45 pounds per inch of width, and a tensile strength of 1690 pounds.

I claim:

1. A coagulum comprising a colloidal, fibrous alumina monohydrate having the boehmite crystal lattice and an acrylamide polymer which has a molecular weight of about from 20,000 to 2,000,000, and which in the absence of the alumina monohydrate, is water-soluble, the alumina monohydrate fibers being bonded by the polyacrylamide and being substantially oriented with respect to each other.
2. A coagulum of claim 1 in which asbestos fibers are dispersed in, and bonded by, the polyacrylamide.
3. A coagulum of claim 1 in which silica, in the form of discrete particles having an average ultimate size in the range of about 5 to 150 millimicrons, is dispersed in, and bonded by, the polyacrylamide.
4. A coagulum of claim 1 in which glycerol is dispersed in an amount sufficient to impart flexibility.
5. In a process for producing coagula of collodial fibrous alumina monohydrate having the boehmite crystal lattice and acrylamide polymers having a molecular weight of about from 20,000 to 2,000,000 and which, in the absence of the alumina monohydrate, are water-soluble, the steps comprising mixing dilute aqueous dispersions of the alumina monohydrate and acrylamide polymer and removing the aqueous menstruum from the insoluble product so formed.
6. In a process for producing coagula of colloidal fibrous alumina monohydrate having the boehmite crystal lattice and acrylamide polymers which have a molecular weight of about from 20,000 to 2,000,000 and which, in the absence of the alumina monohydrate, are water-soluble, wherein the monohydrate fibers are substantially oriented with respect to each other, the steps comprising mixing a dilute, aqueous acrylamide polymer solution and a dilute, aqueous monohydrate dispersion with agitation of sufficient intensity to commingle the solution and dispersion without causing complete turbulence, and thereafter removing the aqueous menstruum from the insoluble product so formed.
7. A process of claim 6 in which the concentration of acrylamide polymer in its solution is up to about 1% by weight and the concentration of alumina monohydrate in its dispersion is up to about 30% by weight.
8. A process of claim 6 in which asbestos fibers are dispersed in the aqueous dispersion of the alumina monohydrate prior to mixing it with the acrylamide polymer solution.
9. A process of claim 6 in which a colloidal silica sol, wherein the silica is in the form of discrete particles having an average ultimate size in the range of about 5 to 150 millimicrons and the pH is about 9, is mixed with the acrylamide polymer solution prior to mixing it with the alumina monohydrate dispersion.

References Cited in the file of this patent

UNITED STATES PATENTS

| | | |
|---|---|---|
| 2,868,753 | Morgan et al. | Jan. 13, 1959 |
| 2,914,498 | Quarles et al. | Nov. 24, 1959 |
| 2,915,475 | Bugosh | Dec. 1, 1959 |
| 2,923,693 | Lemke | Feb. 2, 1960 |
| 2,957,821 | Schifferli | Oct. 25, 1960 |

FOREIGN PATENTS

| | | |
|---|---|---|
| 761,021 | Great Britain | Nov. 7, 1956 |